United States Patent
Deschler et al.

(10) Patent No.: US 9,672,073 B2
(45) Date of Patent: Jun. 6, 2017

(54) NON-PERIODIC CHECK-POINTING FOR FINE GRANULAR RETRY OF WORK IN A DISTRIBUTED COMPUTING ENVIRONMENT

(75) Inventors: Kurt Wilhelm Deschler, Dunbarton, NH (US); Kaushal Mittal, Pune (IN); Curtis Grant Johnson, Bow, NH (US); Victor Mesenzeff, Jr., Dunbarton, NH (US); William Harrison Cox, Manchester, NH (US)

(73) Assignee: SYBASE, INC., Dublin, CA (US)

( * ) Notice: Subject to any disclaimer, the term of this patent is extended or adjusted under 35 U.S.C. 154(b) by 338 days.

(21) Appl. No.: 13/491,063

(22) Filed: Jun. 7, 2012

(65) Prior Publication Data

US 2013/0332938 A1  Dec. 12, 2013

(51) Int. Cl.
*G06F 9/50* (2006.01)

(52) U.S. Cl.
CPC .... *G06F 9/5066* (2013.01); *G06F 2209/5017* (2013.01)

(58) Field of Classification Search
None
See application file for complete search history.

(56) References Cited

U.S. PATENT DOCUMENTS

| | | | |
|---|---|---|---|
| 5,784,616 A * | 7/1998 | Horvitz | 718/102 |
| 6,618,820 B1 * | 9/2003 | Krum | 714/13 |
| 7,627,662 B2 * | 12/2009 | Apelbaum | H04L 67/1008 709/203 |
| 8,321,870 B2 * | 11/2012 | Messier et al. | 718/102 |
| 2004/0172626 A1 * | 9/2004 | Jalan et al. | 717/149 |
| 2006/0048157 A1 * | 3/2006 | Dawson | G06F 9/5072 718/104 |
| 2007/0234364 A1 * | 10/2007 | Lipton et al. | 718/102 |
| 2008/0115143 A1 * | 5/2008 | Shimizu | G06F 9/5066 718/105 |
| 2008/0141254 A1 * | 6/2008 | Lee et al. | 718/102 |
| 2012/0151491 A1 * | 6/2012 | Georgis et al. | 718/104 |

OTHER PUBLICATIONS

Huang, Sheng-Wei. "Improving Speculative Execution Performance with Coworker for Cloud Computing" (2011) IEEE 17th International Conference on Parallel and Distributed Systems.*

* cited by examiner

*Primary Examiner* — Meng An
*Assistant Examiner* — Michael Ayers
(74) *Attorney, Agent, or Firm* — Sterne, Kessler, Goldstein & Fox P.L.L.C.

(57) ABSTRACT

Distributing work in a distributed computing environment that includes multiple nodes. An individual node can receive a work assignment, which can then be divided into a plurality of work units. A first work unit can then be distributed to a first worker node. At least a portion of the first work unit can be re-distributed to a second worker node in response to determining that the first worker node has experienced a failure condition with respect to the first work unit.

21 Claims, 14 Drawing Sheets

NON-PERIODIC CHECK-POINTING FOR FINE GRANULAR RETRY OF WORK IN A DISTRIBUTED COMPUTING ENVIRONMENT

BACKGROUND OF THE INVENTION

Field of the Invention

The invention relates generally to distributed computer systems and, more particularly, addressing the failure of a portion of the distributed computer system to complete a distributed task.

Related Art

Distributed computer systems are made up of several computers or nodes that are connected to each other via a communications network. Modern distributed computer systems are capable of performing enormous computing tasks. To do so, they typically take a large computing task and break it down into smaller tasks or "work units," which can then be distributed amongst several computers or nodes for execution. A work unit is any discreet task designed to be processed by a computer. For instance, in the context of database computing, a work unit might be a subset of data from a query fragment.

A problem can arise when one or more of the computers to which a work unit has been distributed fails to return a result in a timely manner. This can cause the need for the entire large computing task to be attempted again, which leads to delays and inefficient use of resources.

What is needed is a distributed computer system that address the failure of one of its nodes to execute a work unit. Additionally, what is needed is a method that can detect failure situations and retry the pending work allocated to remote nodes instead of failing or waiting indefinitely long for a response.

BRIEF SUMMARY OF THE INVENTION

Embodiments of the invention include systems, methods, computer-readable media, and program products that executing computer tasks on distributed computer networks. According to embodiments, a method of distributing work in a distributed computing environment that includes first and second worker nodes is provided. According to the method, a work assignment or computer task is received. The work assignment can then be divided into a plurality of work units. A first work unit can then be distributed to a first worker node. At least a portion of the first work unit can be re-distributed to a second worker node in response to determining that the first worker node has experienced a failure condition with respect to the first work unit.

According to embodiments of the invention, a computer system configured to function in a distributed computing environment that includes first and second worker nodes is provided. The computer system includes a receiving module configured to receive a work assignment, a work allocator configured to divide the work assignment into a plurality of work units and to distribute a first work unit to the first worker node. The work allocator is configured to re-distribute at least a portion of the first work unit to the second worker node in response to a determination that the first worker node has experienced a failure condition with respect to the first work unit.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS/FIGURES

DETAILED DESCRIPTION OF THE INVENTION

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

The invention will be described within the context of a database system. However, a person of ordinary skill in the art would not understand the invention to be limited to database systems. Instead, the invention is applicable to any number of possible systems such as standard computer systems, distributed computer systems, or any systems that share common resources, to name a few.

Figure 1:
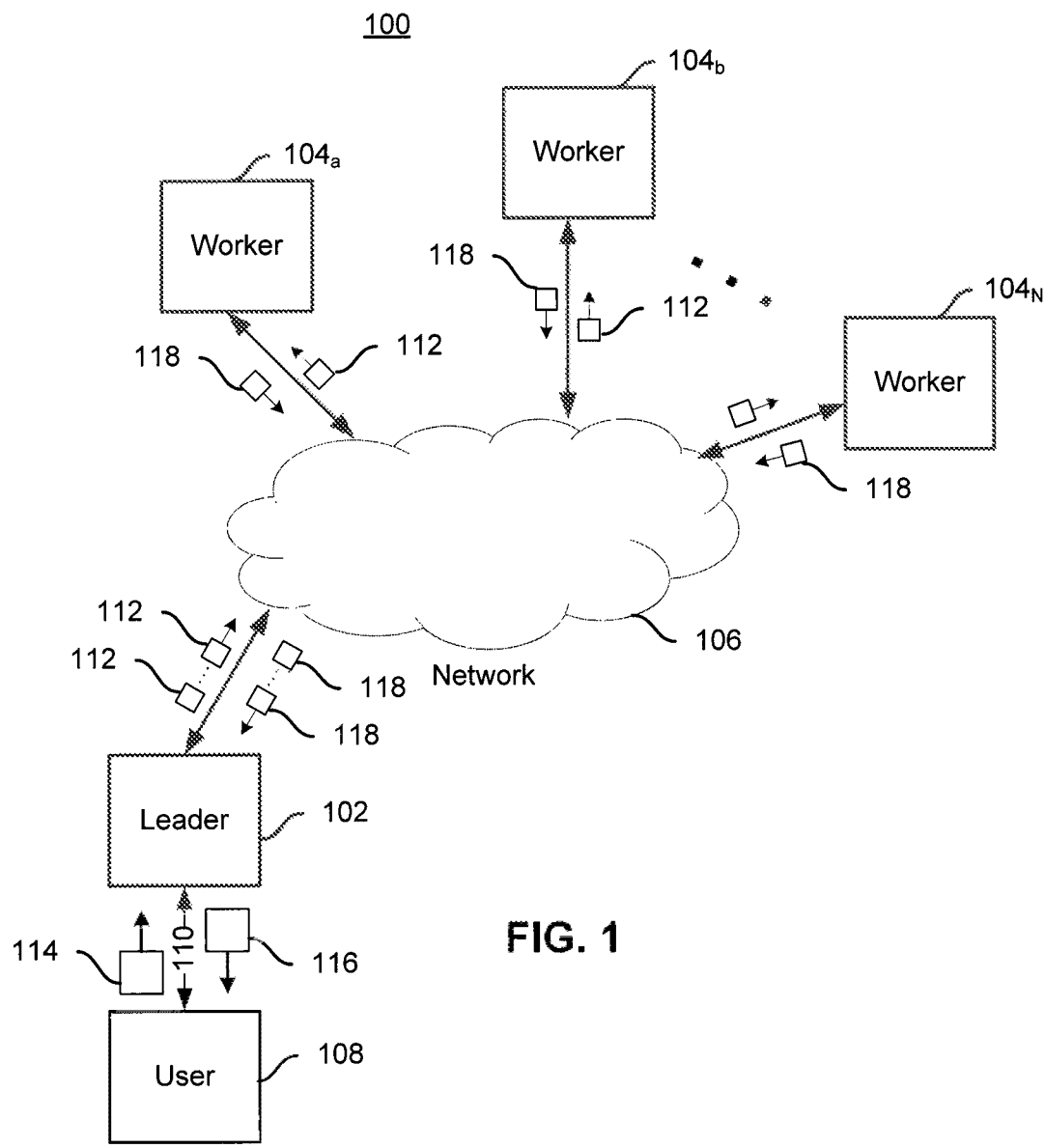
FIG. 1 is a block diagram depicting a distributed computer system according to embodiments of the invention.

Distributed computer systems have a number of desirable properties. For instance, many distributed computer systems have a fairly high tolerance for failure of the individual nodes, the ability to perform rather large and complex computing tasks, and easy scalability, to name a few advantages. FIG. 1 depicts an exemplary distributed computer system according to embodiments of the invention.

As shown in FIG. 1, the distributed computer system 100 might comprise a leader node 102 and a number of worker nodes $104_a$, $104_b$ ... $104_N$ (hereafter referred to collectively as worker nodes 104). The leader node and the various worker nodes 104 are connected to each other via a network 106, which can be any sort of suitable communications network.

A user 108 can communicate with any node in the system and send it a computing task or work assignment (e.g., a database query) 114 via communications channel 110. According to embodiments of the invention, when a user communicates a computing task or work assignment 114 to a particular node, that node becomes the leader node 102 for the purposes of completing that task. The leader node 102 can divide up the task into a number of smaller tasks or work units 112 and distribute the work units 112 amongst the various worker nodes 104 via the network 106. While, according to some embodiments, it is possible for a single node to function as a dedicated leader, it is also possible for whatever node receives the computing task 110 to assume the leader node 102 role for the purposes of completing that computing task 110. When the worker nodes 104 finish executing the work units 112, they can send the results 118 back to the leader node 102. The leader node can then aggregate the results 118 and return the aggregate or final results 116 to the user 108.

Figure 2:
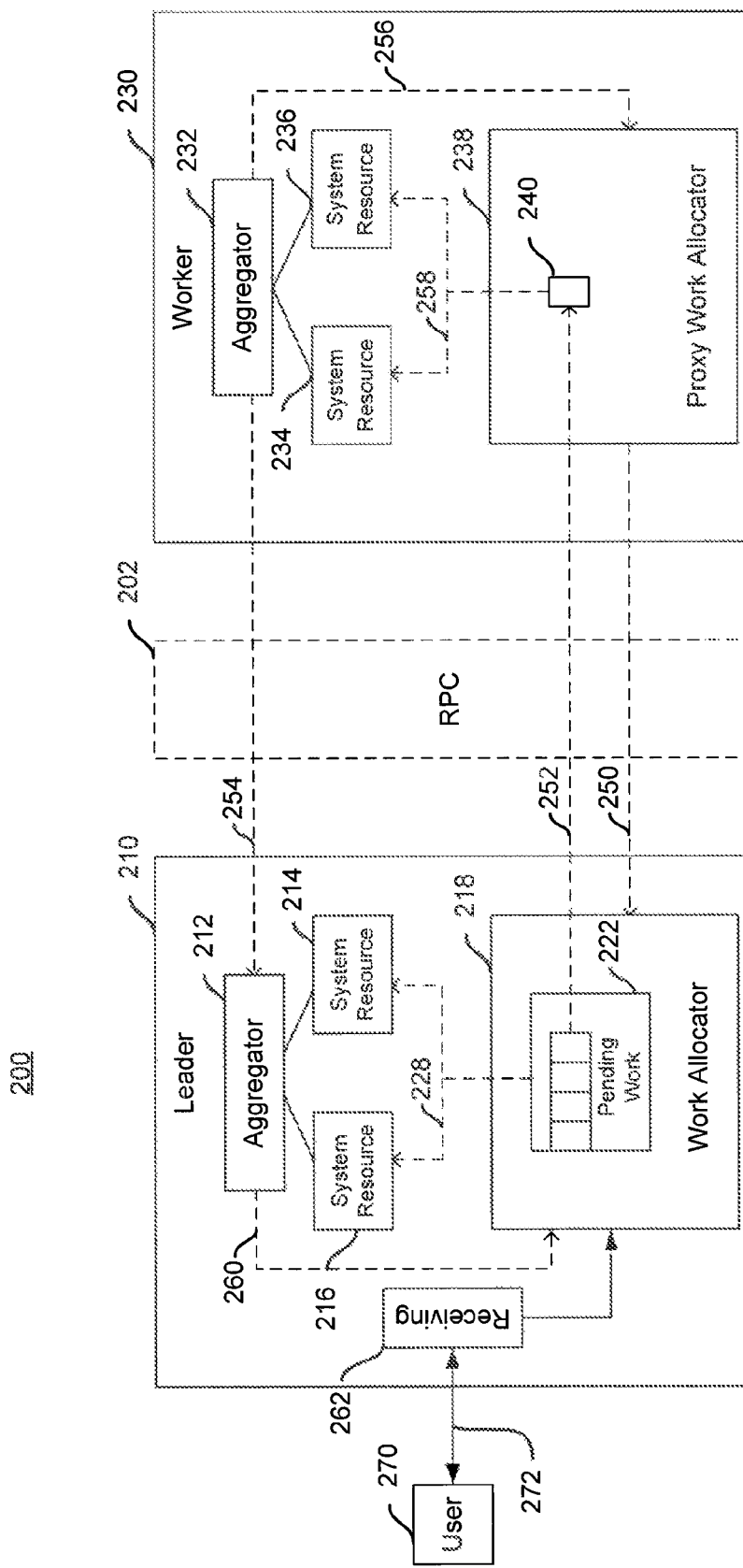
FIG. 2 is a block diagram depicting two nodes of a distributed computer system according to embodiments of the invention.

FIG. 2 depicts an exemplary distributed computing system 200 having two nodes: a leader node 210 and a worker node 230. As shown in FIG. 2, the leader node can include an aggregator 212, a work allocator 218, one or more system resources 214 and 216, a pending work queue 218, and an interface/receiving module 262.

According to embodiments of the invention, the leader node 210 receives a work assignment from the user 270 via communications channel 272 at the interface/receiver module 262. The interface/receiver module 262 can then communicate the work assignment to the work allocator 222, which can be tasked with dividing the work assignment into multiple work units for distribution to the various worker nodes 230. The pending work queue 222 can contain a queue of work units that have yet to be assigned to a particular worker node. Additionally, the work allocator may keep track of which work units remain unassigned, which work units have been assigned, which work units are completed, and which work units have failed according to embodiments of the invention.

The leader node also includes system resources 214 and 216 to which various work units may be assigned if deemed appropriate by the work allocator 218. For instance, the work allocator 118 can assign a work unit 10 a system resource 213 or 216 by sending the appropriate message 228. The aggregator 212 receives the results of the completed work units from the various worker nodes 230 and from the leader node's own system resources 214 and 216 and aggregates them together. Additionally, the aggregator 212 can indicate to the work allocator 218 when it receives results for the various work units that have been assigned.

A worker node 230 may contain a proxy work allocator 238 to manage its assigned work unit 240, system resources 234 and 236 and an aggregator 232 according to embodiments of the invention. According to embodiments, the proxy work allocator 238 can indicate to the leader node's work allocator 218 that it is capable of accepting a work unit 240 by sending a message 250 via the network. According to embodiments of the invention the message may be facilitated via a remote procedure call infrastructure 202. When the leader work allocator 218 receives a message from proxy work allocator 238 that the worker node 230 is ready to receive a work unit, it sends a message 252 back with a work unit 240 for execution. Additionally, the work allocator may store identifying information relating to the assigned work unit 240. According to embodiments of the invention, the identifying information may include a unique identifier for the work unit, an identifier to identify the worker node to which the work unit 240 has been assigned, a time stamp indicating the time at which the work unit was assigned, and links to information about all of the other work units that have been assigned to the worker node 230. According to some embodiments, the leader work allocator 218 may send a single work unit 240 upon receiving a request message 250, however it is also possible for the work allocator 218 to send multiple work units at a time to the worker node 230 according to some embodiments.

When worker node 230 receives a work unit 240, the proxy work allocator assigns it to an appropriate system resource 236 by sending an appropriate message 258. For instance, if the proxy work allocator 238 sends the work unit 240 to system resource 234 for execution, then system resource 234 can execute the work unit and send the results of the work unit to the aggregator 232. The aggregator 232, upon receipt of the completed results of the execution of the work unit 240, can send a message 256 to the proxy work allocator 238 indicating that the work unit 240 has been successfully completed. The proxy work allocator 238 can then send another message 250 to the leader node 210 indicating that it can receive another work unit according to embodiments of the invention.

The worker node aggregator 232 can, when it receives results from an executed work unit 240, send the results to leader aggregator 212 via message 254 according to embodiments of the invention. However, according to some embodiments of the invention, worker aggregator 232 aggregates the results of several completed work units and sends a message 254 containing all of the several results at once to the leader aggregator 212. According to some embodiments, the worker aggregator can send the message periodically after a predetermined amount of time, once a certain number work units have been completed, or after the aggregated results reach a pre-determined size.

According to embodiments of the invention, the worker node can determine that it has experienced a re-distribution condition (e.g., a failure to successfully execute the work unit) with respect to a work unit 240 that it has been assigned. For instance, the proxy work allocator 238 could determine that a predetermined amount of time has elapsed since it assigned a work unit to a system resource 234 and it has yet to receive a message 256 indicating receive of results of the execution of the work unit 240 by system resource 234. According to embodiments of the invention, when the worker node 230 has detected such a re-distribution condition the worker node 230 can send a message to the leader 210 with the completed results it has aggregated so far.

When leader work aggregator 212 receives completed results from assigned work units, it can combine them with previously received results. Once the work aggregator does this, the origin of received results will not be distinguishable according to embodiments of the invention.

Figure 3:
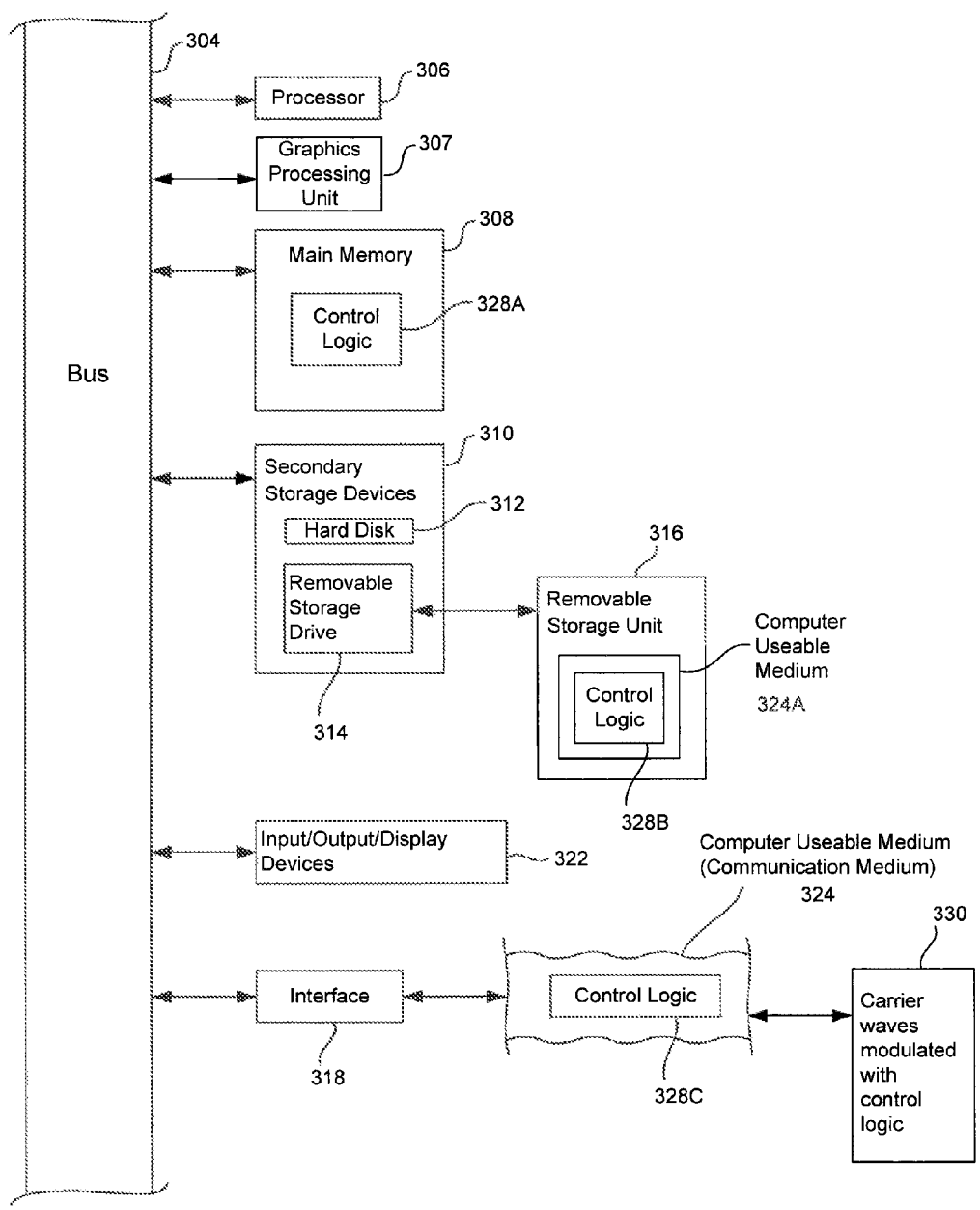
FIG. 3 is a block diagram depicting a computer according to embodiments of the invention.

In an embodiment of the present invention, the system and components of the present invention described herein are implemented using well known computers, such as computer 300 shown in FIG. 3. For instance, while FIG. 2 depicts leader node 210 and worker node 230 as having slightly different functional blocks, they could be implemented as computer 300 according to embodiments of the invention.

Computer 300 can be any commercially available and well known computer capable of performing the functions described herein, such as computers available from International Business Machines, Apple, Sun, HP, Dell, Compaq, Digital, Cray, etc.

Computer 300 includes one or more processors (also called central processing units, or CPUs), such as a processor 306. The processor 306 is connected to a communication bus 304. Processors 306 may include any conventional or special purpose processor, including, but not limited to, digital signal processor (DSP), field programmable gate array (FPGA), and application specific integrated circuit (ASIC).

Computer 300 includes one or more graphics processing units (also called GPUs), such as GPU 307. GPU 307 is a specialized processor that executes instructions and programs selected for complex graphics and mathematical operations in parallel.

Computer 300 also includes a main or primary memory 308, such as random access memory (RAM). The primary memory 308 has stored therein control logic 328A (computer software), and data.

Computer 300 also includes one or more secondary storage devices 310. The secondary storage devices 310 include, for example, a hard disk drive 312 and/or a removable storage device or drive 314, as well as other types of storage devices, such as memory cards and memory sticks. The removable storage drive 314 represents a floppy disk drive, a magnetic tape drive, a compact disk drive, an optical storage device, tape backup, etc.

The removable storage drive 314 interacts with a removable storage unit 316. The removable storage unit 316 includes a computer useable or readable storage medium 324 having stored therein computer software 328B (control logic) and/or data. Removable storage unit 316 represents a floppy disk, magnetic tape, compact disk, DVD, optical storage disk, or any other computer data storage device. The removable storage drive 314 reads from and/or writes to the removable storage unit 316 in a well-known manner.

Computer 300 also includes input/output/display devices 322, such as monitors, keyboards, pointing devices, touchscreen displays, etc.

Computer 300 further includes a communication or network interface 318. The network interface 318 enables the computer 300 to communicate with remote devices. For example, the network interface 318 allows computer 300 to communicate over communication networks or mediums 324B (representing a form of a computer useable or readable medium), such as LANs, WANs, the Internet, etc. The network interface 318 may interface with remote sites or networks via wired or wireless connections.

Control logic 328C may be transmitted to and from computer 300 via the communication medium 324B. More particularly, the computer 300 may receive and transmit carrier waves (electromagnetic signals) modulated with control logic 330 via the communication medium 324B.

Any apparatus or manufacture comprising a computer useable or readable medium having control logic (software) stored therein is referred to herein as a computer program product or program storage device. This includes, but is not limited to, the computer 300, the main memory 308, the secondary storage devices 310, the removable storage unit 316 and the carrier waves modulated with control logic 330. Such computer program products, having control logic stored therein that, when executed by one or more data processing devices, cause such data processing devices to operate as described herein, represent embodiments of the invention.

Figure 4:
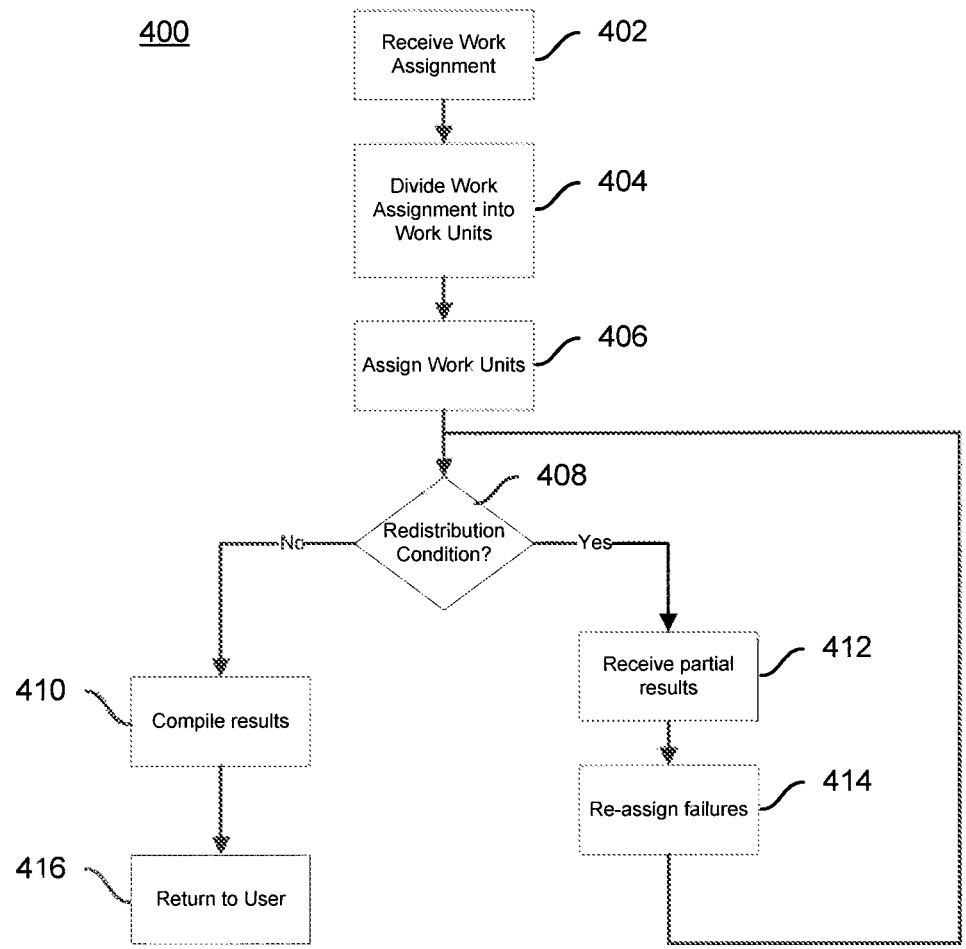
FIG. 4 is a flowchart depicting a method of assigning work to a node in a distributed computer system according to embodiments of the invention.

FIG. 4 is a flowchart that illustrates a method 400 of allocating work in a distributed computer system according to embodiments of the present invention. According to the method 400, a work assignment can be received at a node at step 402. For the purposes of completing the received work assignment, the receiving node can then act as the leader node, according to embodiments of the invention. However, it is also possible for there to be a dedicated leader node according to some embodiments.

At step 404, the work assignment (computing task) is divided into a number of discrete work units by the leader node 210. Each work unit can have associated with it a data structure that contains unique information about the work unit. A work unit is a discrete subset the larger work assignment that can be processed by an individual node of the distributed computer system. For instance, in the context of database systems, a work unit might be a discrete subset of data from a query fragment that is assigned to be processed by a thread running on one of the nodes. At step 406, the work units are assigned to worker nodes 230. According to embodiments of the invention, the work units can be assigned to the worker nodes as they send messages 250 indicating that they can receive them. However, according to other embodiments the work unit assignments could be pushed onto the individual worker nodes by the leader node 210. According to embodiments of the invention, when the leader node 210 assigns an individual work unit, it can also update a data structure associated with that work unit with data indicating, for instance, a time stamp and the worker node 230 to which it was assigned.

Once all of the work units for a work assignment have been assigned at step 406, the leader computer determines whether there have been any re-distribution conditions at step 408. According to some embodiments, the leader computer can determine that there has been a re-distribution condition when a pre-determined amount of time has transpired since the work unit was initially assigned to a worker node. For instance, according to some embodiments, the leader node 210 can check the time stamp stored in the data structure associated with each work unit and determine whether a pre-determined amount of time has elapsed. If a pre-determined amount of time has passed without receiving results for that work unit, then the leader 210 may assume a failure according to embodiments of the present invention. However, according to other embodiments, an individual worker node may recognize that an re-distribution condition has occurred and send an appropriate message indicating the failure to the leader computer.

If it is determined that one or more re-distribution conditions have not occurred at step 408, then the results from the work units that has been accumulated can be compiled at step 410 and the compiled results can, for instance, be returned to the user at step 416. However, if it has been determined at step 408 that one or more re-distribution conditions has occurred, then any partial results that are available are received at step 412. According to some embodiments, this step is omitted. At step 414, the work unit that experienced a re-distribution condition e.g., the failed work unit (or portion thereof), can be reassigned to another worker node to complete. Once the all of the reassignment of all of the failed work units is complete at step 414, then the method can loop back to step 408 in order to determine if any of these re-assigned work units has failed.

Figure 5:
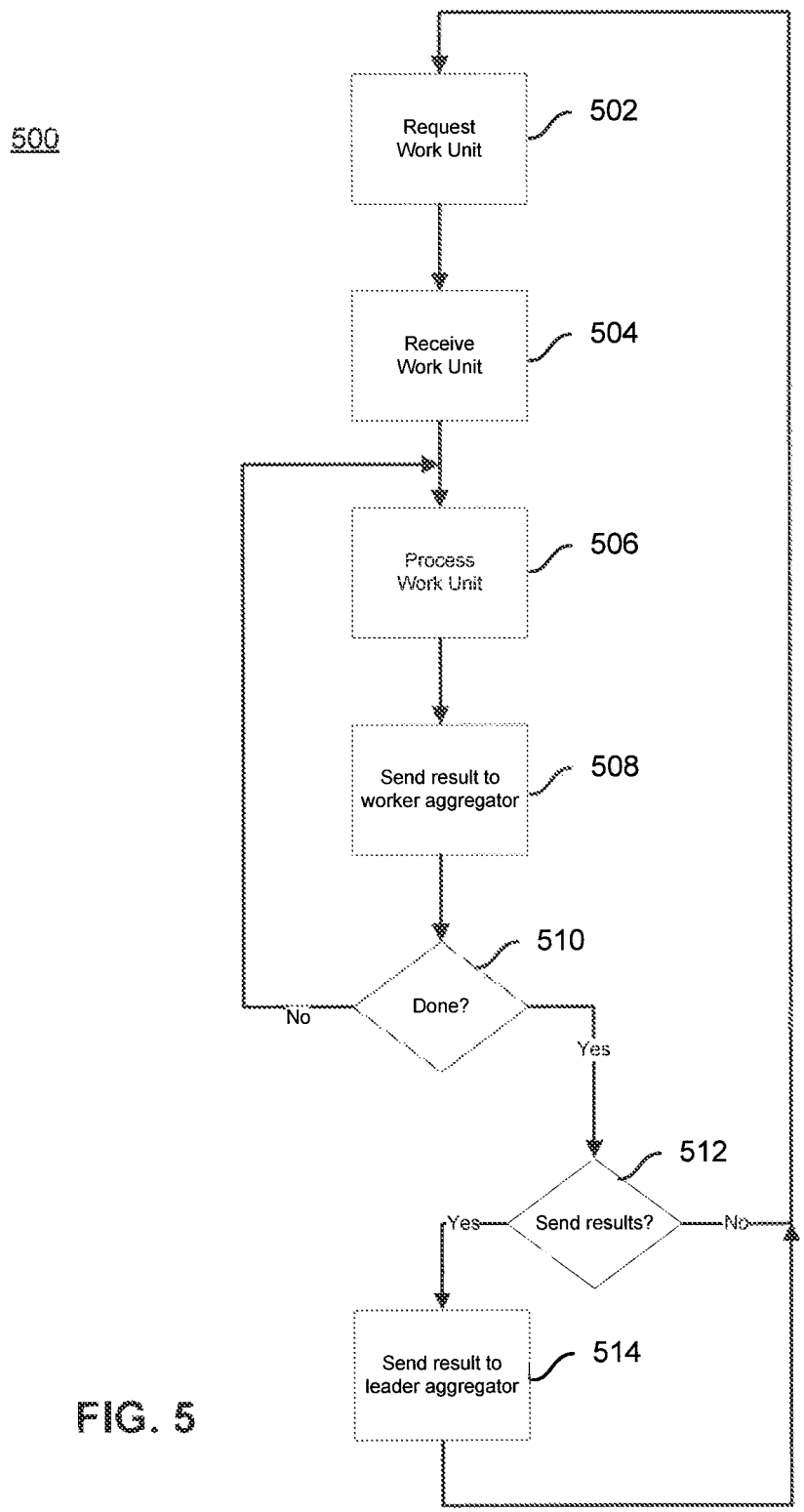
FIG. 5 is a flowchart depicting the operation of a node in a distributed computer system according to embodiments of the invention.

FIG. 5 is a flowchart depicting a method 500 of receiving and processing work units at a worker node according to embodiments of the present invention. At step 502, the worker node determines that it has availability to receive one or more work units and so it requests work units from the leader computer. According to various embodiments, the worker node can determine that it has availability to receive more work units when it completes a work unit, when it becomes newly available, or when it has room in its task queue. Additionally, according to various embodiments, the proxy work allocator can be tasked with making this determination.

At step 504, the worker node receives the one or more work units and begins processing them at step 506. The worker node can process the assigned work unit 240 by sending it to an appropriate system resource 234 or 236. When the system resource 234 or 236 finishes executing the work unit 240, it can send the results to the worker aggregator 232 at step 508. According to other embodiments, however, the worker node can send the results to the aggregator 232 on a continuous basis or periodically as the work unit 240 is executing. That is, the results may be sent to the aggregator 232 before the execution of the work unit 240 is completed according to some embodiments. If the worker node has received multiple work units, then, at step 510, the worker node (or, more specifically, the proxy work allocator 238 according to various embodiments) determines whether all of the assigned work units have been executed. If not all of the work units have been executed, then the method loops back to step 506 and the next work unit (as determined by the proxy work allocator according to various embodiments) is processed. If it is determined at step 510 that all of the work units are complete (or if the node only receives a single work unit at a time), then the method 500 can next determine whether it is appropriate to send the aggregated results of the completed work units to the leader node aggregator 212 at step 512. As previously noted, according to embodiments of the invention, the aggregated results can be sent to the leader node aggregator 212 upon completion of the execution of a work unit, periodically, when the aggregated results reach a certain size, or after a pre-determined number of work units has been executed according to various embodiments of the invention. If it is appropriate to send the aggregated results to the leader node 210, then the method send the results at step 514 and then loops back to step 502 and requests additional work units. If it is not appropriate to send the aggregated results to the leader node, then the method 500 simply loops back to step 502 and requests another work unit.

Figure 6:
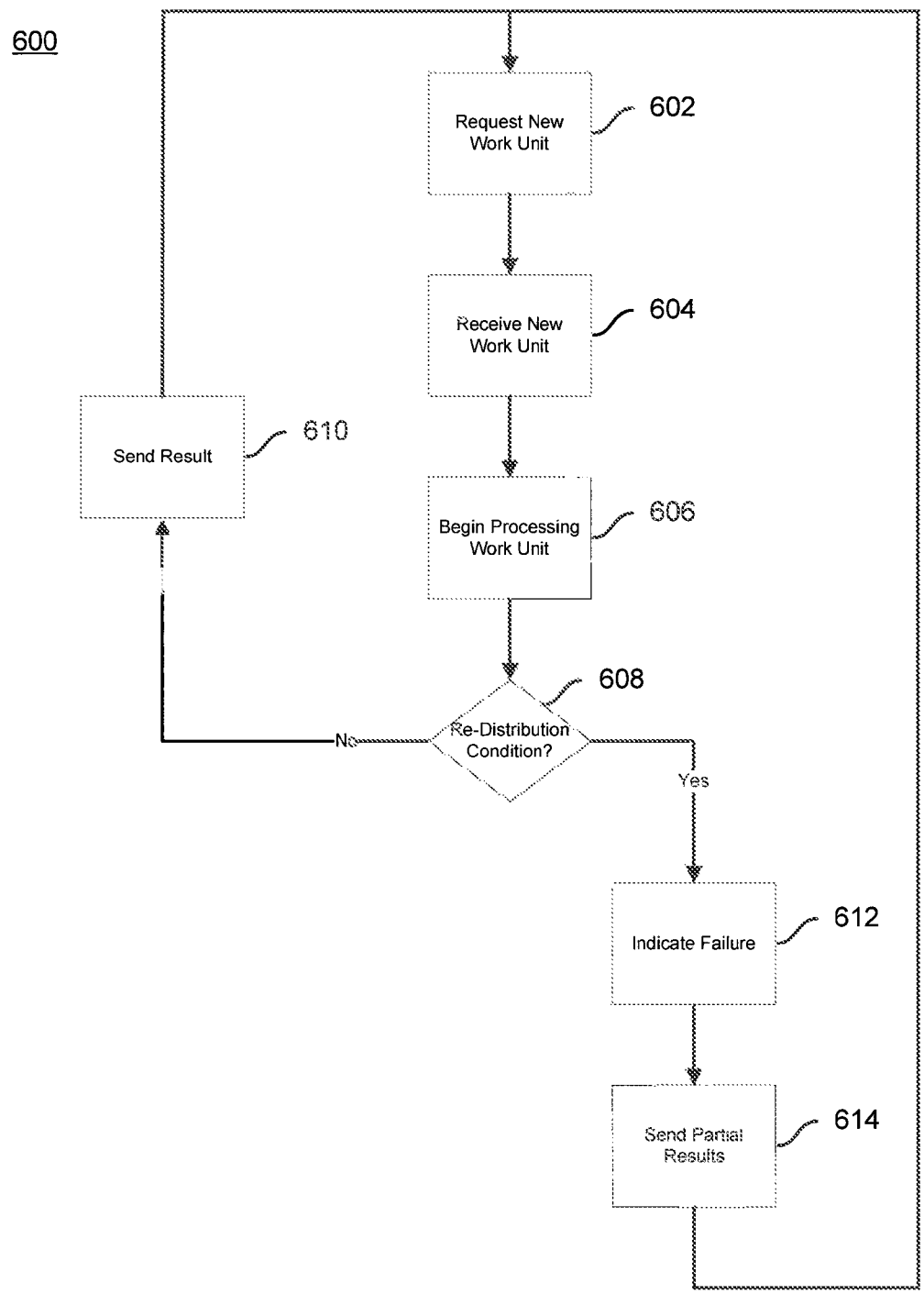
FIG. 6 is a flowchart depicting the operation of a node in a distributed computer system according to embodiments of the invention.

FIG. 6 is a flowchart depicting an alternative method 600 of receiving and processing work units at a worker node according to embodiments of the present invention. At step 602 the worker node can request a new work unit if it determines that it is available to receive a new work unit. According to some embodiments this can occur when the worker node completes a new work unit, becomes newly available, or predicts that it will be available shortly for processing a work unit—for instance, if its task queue is short. The new work unit can be received at step 604 and processing of the work unit can begin at step 606. According to embodiments of the present invention, the worker node can determine whether processing of the work unit has failed at step 608. If the execution of the work unit has not failed, then the result of the work unit can be sent to the sink and a new work unit can be requested. However, if the processing of the work unit has failed, then a message can be sent to the leader computer to indicate that the failure has occurred at step 612 and any partial results of the execution of the work unit can be sent to the leader computer. According to some embodiments, after step 614, the worker node can request a new work unit at step 602. However, this may not occur according to other embodiments.

Figure 7:
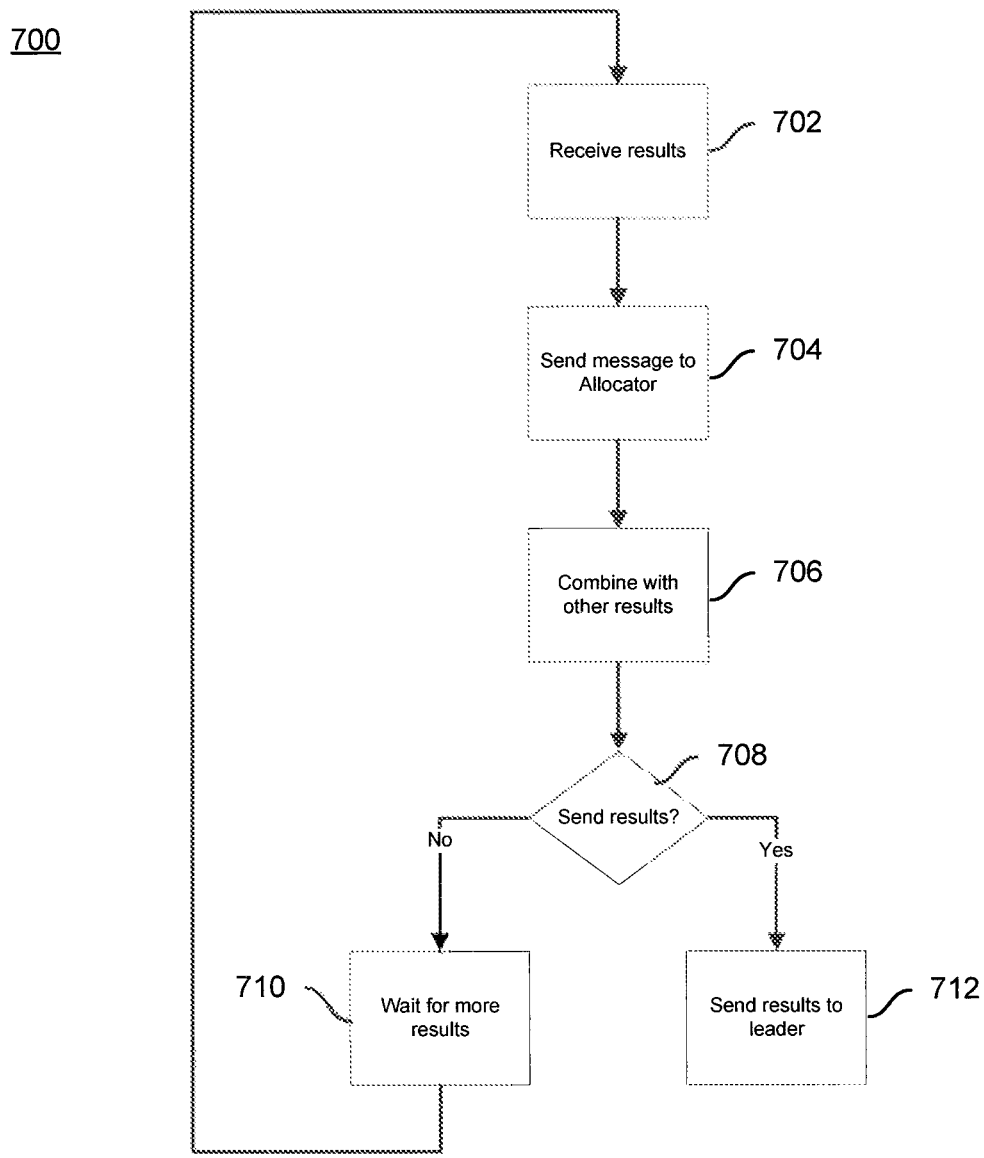
FIG. 7 is a flowchart illustrating the method of operation of a remote sink located at a worker node according to embodiments of the invention.

FIG. 7 is a flow diagram illustrating the method of operation 700 of worker aggregator 232 located at a worker node according to embodiments of the present invention. At step 702 the aggregator 232 receives the results of an executed work unit. According to various embodiments, the aggregator 232 may receive the results while the work unit is still executing or after its execution is completed. Once the aggregator 232 receives the result at step 702, it can send a message to the proxy work allocator indicating that the result was received at step 704. Additionally, at step 706, the received results can be combined with any other received results. At step 708, the aggregator 232 determines whether it is appropriate to send the accumulated results to the leader computer. If not, then the aggregator 232 waits for more results at step 710. If it is appropriate to send the results, then the sink sends a message to the leader computer containing the results of the executed work unit or work units that it has accumulated.

According to embodiments of the invention, it can be appropriate for the aggregator 232 send the accumulated results when a work unit completes execution, at regular time intervals, or when the accumulated results reach a certain size. For instance, according to some embodiments, the accumulated results can be sent to the leader computer when a page of results has been filled or when the size of the file containing the accumulated results reaches a predetermined size.

Figure 8:
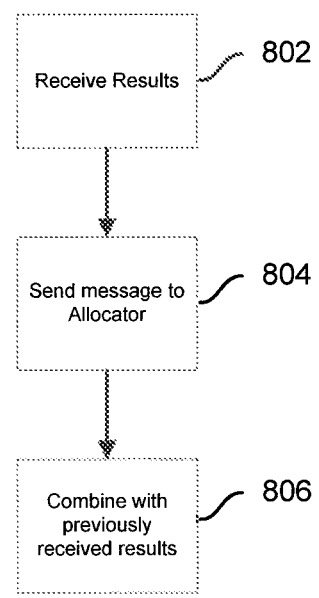
FIG. 8 is a flowchart illustrating the method of operation 700 of a sink located at a leader computer according to embodiments of the invention.

FIG. 8 is a flowchart depicting aspects of the method of operation of the leader aggregator 212 at the leader computer according to embodiments of the invention. According to the method 800, the aggregator 212 receives set of results of a completed work unit at step 802. According to various embodiments, the results can be from work units executed by worker node or by work units executed by the leader computer. At step 804, the work allocator is sent a message that the results have been received for the particular work unit. At step 806, the results are combined with previously received results. After this step occurs, the origin of the results will no longer be distinguishable.

Figure 9A:
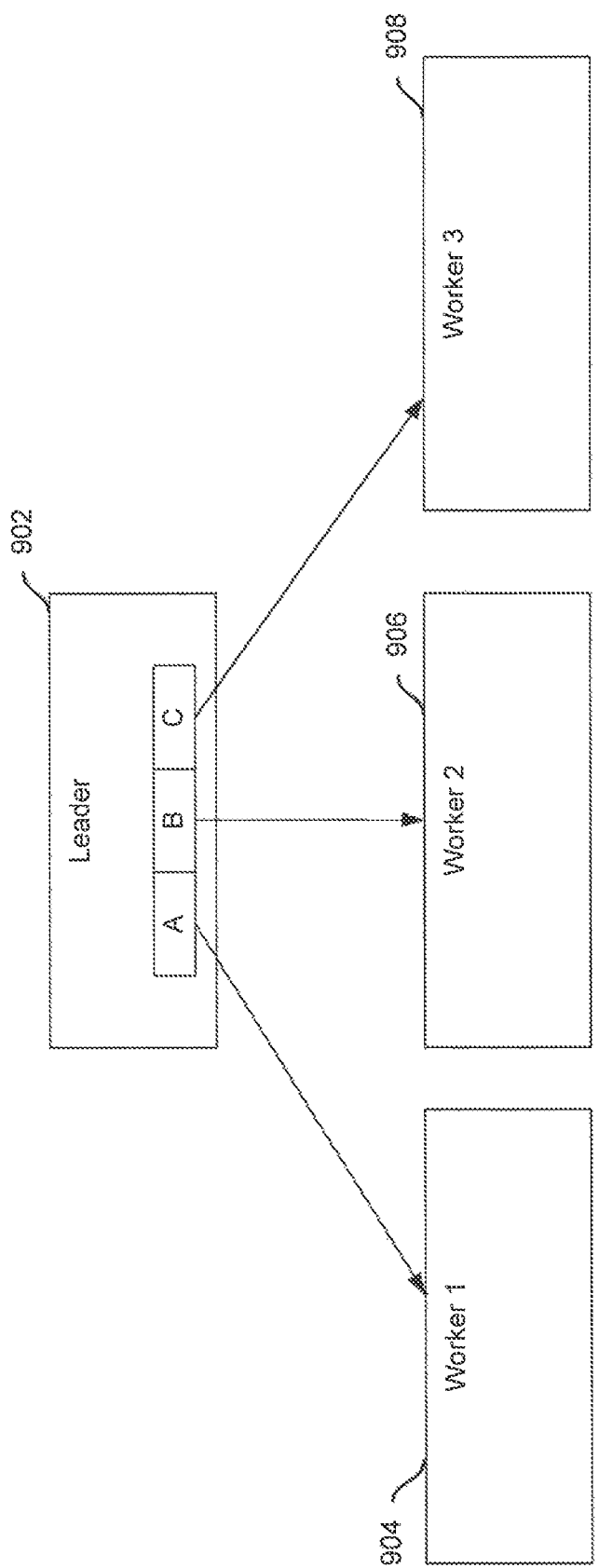
FIGS. 9A-9E illustrate a process of assigning and re-assigning work units according to embodiments of the invention.
Figure 9B:
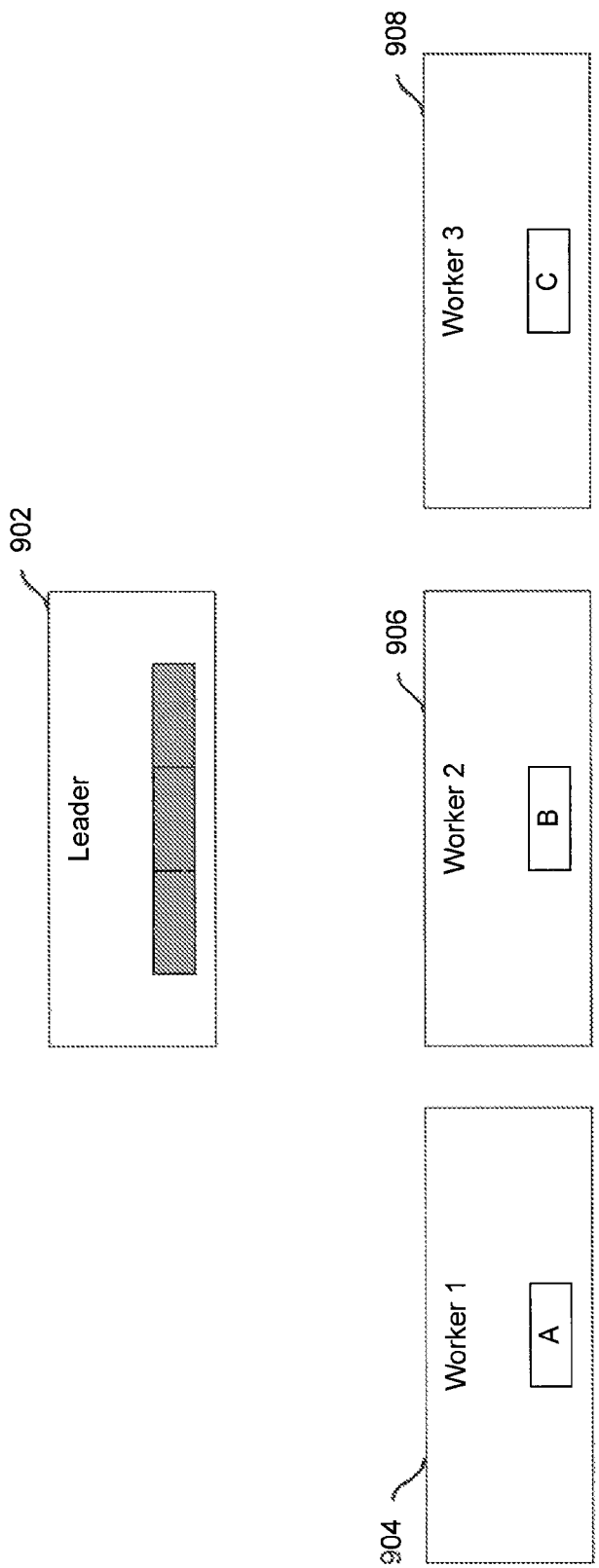
Figure 9C:
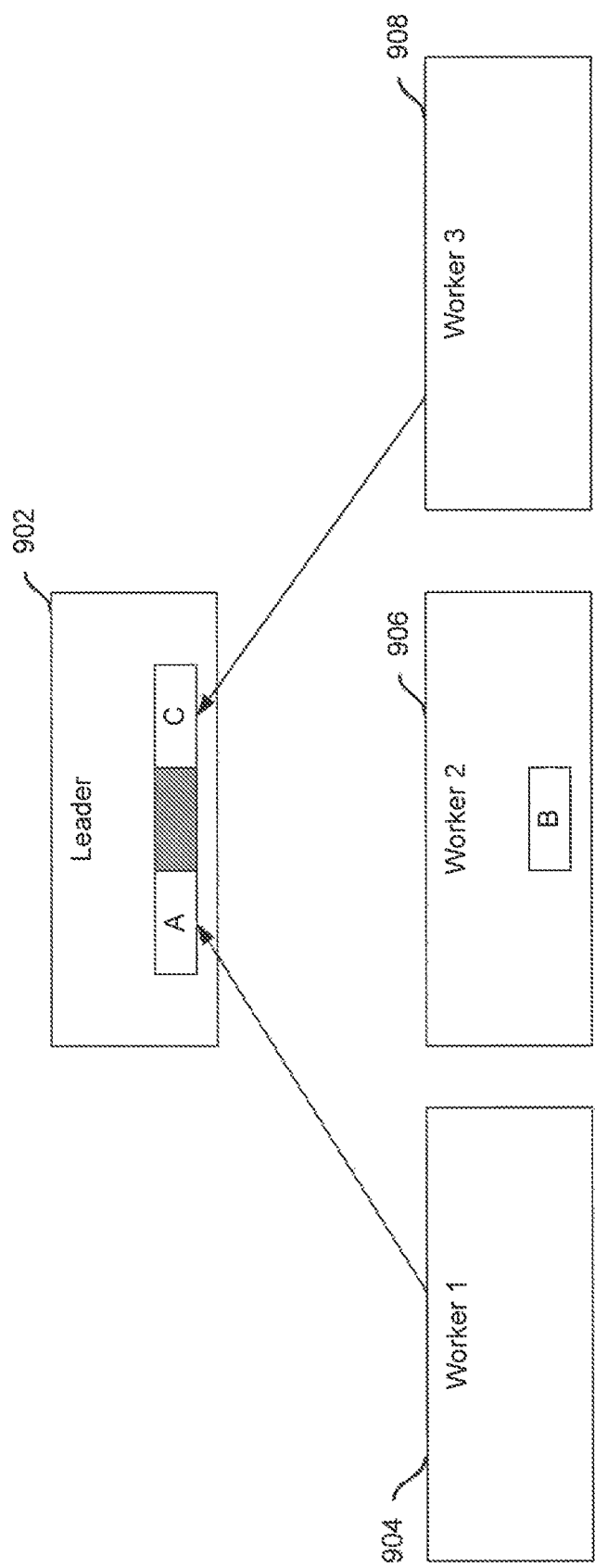
Figure 9D:
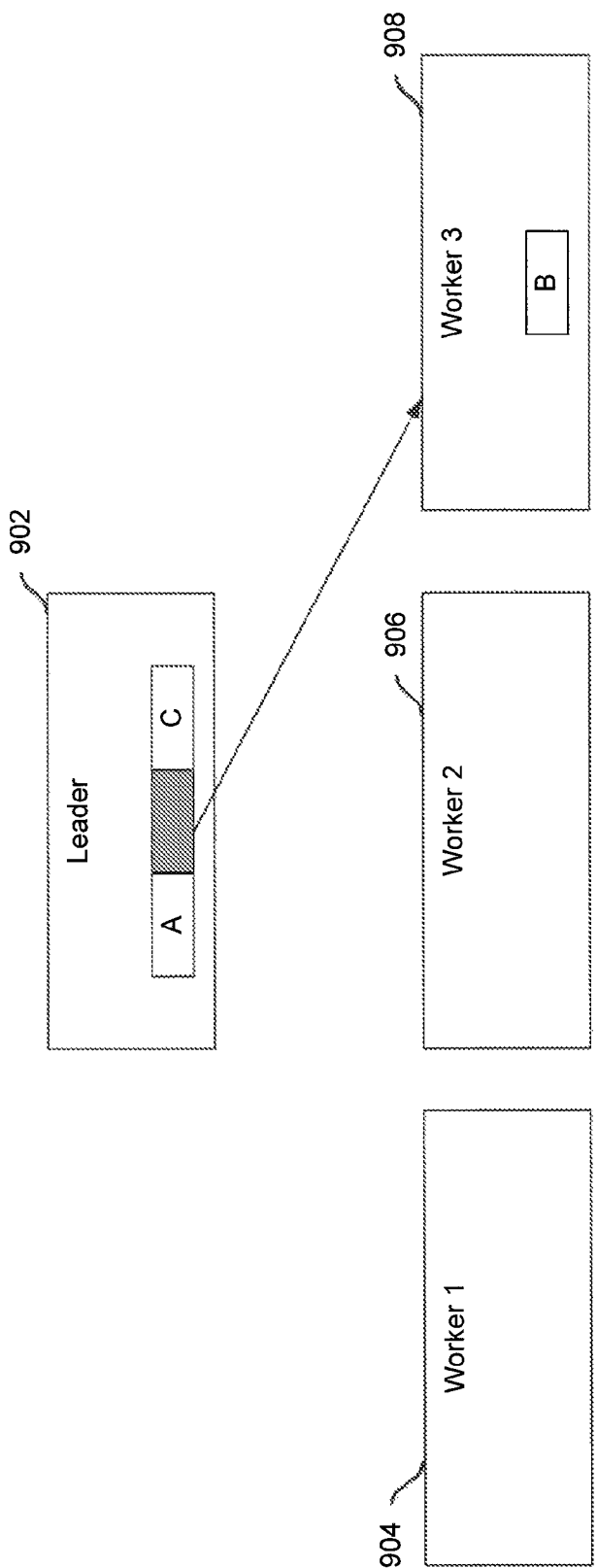
Figure 9E:
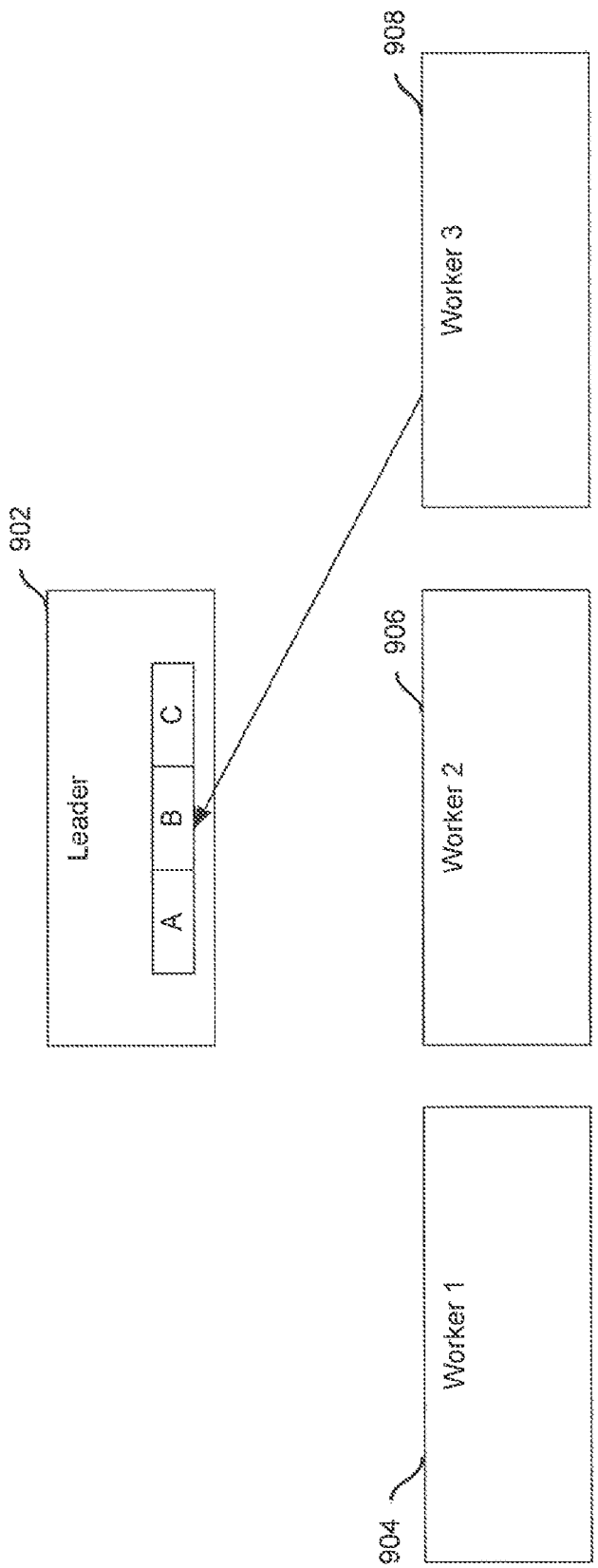

FIGS. 9A-9E graphically depict an example of how work units can be distributed to worker nodes and re-assigned when, for example, a failure is detected according to embodiments of the invention. FIG. 9A depicts a scenario with a leader computer 902 that has three work units to distribute: A, B, and C. The leader computer 902 distributes work unit A to worker node 1 904, work unit B to worker node 2 906 and work unit C to worker node 3 908. With the work units distributed, each of the worker nodes can execute their work units, as is shown in FIG. 9B. In FIG. 9C, worker node 1 904 and worker node 3 908 have completed their work units and sent the results back to the leader computer 902 for aggregation with the other completed work units. Worker node 2 906, however, has not completed executing work unit B and has not sent back any results. If the leader computer 902 determines that worker node 2 904 has experienced a failure condition with respect to work unit B, then the leader computer can re-assign work unit B to another worker node. FIG. 9D depicts the leader computer re-assigning work unit B to worker node 3 908 for execution. If worker node 3 908 successfully executes the work unit, then it can send the results back to leader computer 902, which is shown in FIG. 9E.

Figure 10:
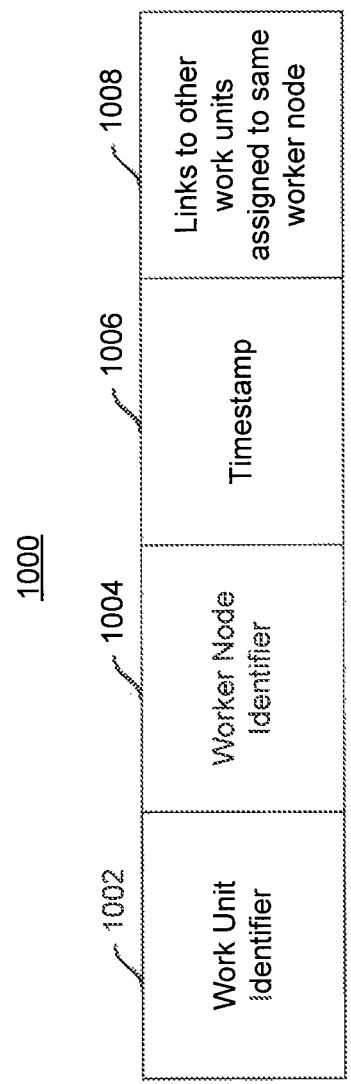
FIG. 10 depicts a data structure that can be associated with each assigned work unit according to embodiments of the invention.

FIG. 10 depicts a data structure that can be used to store information concerning the work units according to embodiments of the invention. According to various embodiments, each work unit may have such a data structure 1000 associated with it. The data structure may contain a work unit identifier 1002, a worker node identifier, a times stamp 1006, and links to other work units assigned to the same worker node 1008. The work unit identifier 1002 is preferably unique to the particular work unit according to embodiments of the present invention. The worker node identifier 1004 identifies the worker node to which the work unit has been assigned. The timestamp 1006 indicates the time at which the work unit was last assigned to a work unit. The timestamp 1006 can later be used to determine whether a worker node has experienced a failure condition with respect to the work unit. The data structure 1008 may also contain links to other work units that were assigned to the same worker node 1008. These links can be helpful in determining what needs to be re-assigned in the event of a failure.

The invention can work with software, hardware, and/or operating system implementations other than those described herein. Any software, hardware, and operating system implementations suitable for performing the functions described herein can be used.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of distributing work in a distributed computing environment that comprises a leader node, a leader aggregator at the leader node, a first worker node, a worker aggregator at the first worker node, a second worker node, and a worker aggregator at the second worker node, the method comprising:
   receiving a work assignment at the leader node;
   dividing, by the leader node, the work assignment into a plurality of work units;
   receiving a message from the first worker node indicating that the first worker node is capable of accepting a work unit;
   distributing, by the leader node, a first work unit of the plurality of work units to the first worker node in response to the received message;
   receiving, by the worker aggregator at the first worker node, first results upon completely processing the first work unit;
   requesting, by the first worker node, a second work unit of the plurality of work units, without sending the first results to the leader aggregator;
   receiving, by the worker aggregator at the first worker node, second results representing a processed portion of the second work unit, as the first worker node processes the second work unit;
      when the second work unit is completely processed, receiving, by the leader aggregator, the first and second results;
      when the second work unit is not completely processed, receiving a second message, by the leader node, from the first worker node indicating that the first worker node has experienced a re-distribution condition with respect to the second work unit, wherein the re-distribution condition comprises a detected failure to completely process the second work unit, wherein the second message from the first worker node contains the second results from the second work unit available when the first worker node experienced the re-distribution condition;
   re-distributing, by the leader node, an unprocessed portion of the second work unit to the second worker node for processing in response to receiving the second message;
   receiving, by the worker aggregator at the second worker node, third results upon completely processing the unfinished portion of the second work unit; and
   receiving, by the leader aggregator, the first, second, and third results.

2. The method of claim 1, further comprising:
   distributing, by the leader node, a second work unit of the plurality of work units to the second worker node; and
   receiving, by the leader node, a result of the second work unit from the second worker node.

3. The method of claim 2, wherein the re-distributing the at least a portion of the first work unit to the second worker node occurs following the receiving the result of the second work unit from the second worker node.

4. The method of claim 1, wherein the re-distribution condition further comprises an elapsed tune from when the first work unit was distributed to the first worker node that exceeds a pre-determined threshold.

5. The method of claim 1, wherein the step of distributing the first work unit to the first worker node comprises sending multiple work units to the first worker node.

6. The method of claim 1, wherein the work assignment is a database query.

7. The method of claim 1, wherein each work unit has associated with it work unit information comprising: a work unit identifier, an identifier for the last worker node to which it was assigned, a timestamp indicating the time at which the work unit was last assigned, and a link to one or more other pending work units assigned to the same worker node that have not been completed.

8. The method of claim 7, wherein the step of distributing the first work unit includes updating the work unit information associated with that work unit.

9. A computer system configured to function in a distributed computing environment that comprises the computer system, a leader node, a leader aggregator at the leader node, a first worker node, a worker aggregator at the first worker node, a second worker node, and a worker aggregator at the second worker node, the computer system comprising:
- an interface configured to communicate with the first worker node and the second worker node; and
- one or more processors communicatively coupled to the interface and configured to:
  - receive a work assignment;
  - receive a message from the first worker node indicating that the first worker node is capable of accepting a work unit;
  - divide the work assignment into a plurality of work units and to distribute a first work unit of the plurality of work units to the first worker node, in response to the received message;
  - receive, by the worker aggregator at the first worker node, first results upon completely processing the first work unit;
  - request, by the first worker node, a second work unit of the plurality of work units, without sending the first results to the leader aggregator;
  - receive, by the worker aggregator at the first worker node, second results representing a processed portion of the second work unit, as the first worker node processes the second work unit;
    - when the second work unit is completely processed, receiving, by the leader aggregator, the first and second results;
    - when the second work unit is not completely processed, receive a second message, by the leader node, from the first worker node indicating that the first worker node has experienced a re-distribution condition with respect to the second work unit, wherein the re-distribution condition comprises a detected failure to completely process the second work unit, wherein the second message from the first worker node contains the second results from the second work unit available when the first worker node experienced the re-distribution condition;
  - re-distribute, by the leader node, an unprocessed portion of the second work unit to the second worker node for processing in response to receiving the second message;
  - receive, by the worker aggregator at the second worker node, third results upon completely processing the unfinished portion of the second work unit; and
  - receive, by the leader aggregator, the first, second, and third results.

10. The computer system of claim 9, wherein the one or more processors are further configured to distribute a second work unit of the plurality of work units to the second worker node, and wherein the computer system is configured to receive a result of the second work unit from the second worker node.

11. The computer system of claim 10, wherein the one or more processors are further configured to re-distribute at least a portion of the first work unit to the second worker node in response to receiving the result of the second work unit from the second worker node.

12. The computer system of claim 9, wherein the re-distribution condition further comprises an elapsed time from when the first work unit was distributed to the first worker node that exceeds a pre-determined threshold.

13. The computer system of claim 9, wherein the one or more processors are further configured to distribute the first work unit to the first worker node by sending multiple work units to the first worker node.

14. The computer system of claim 9, wherein the work assignment is a database query.

15. The computer system of claim 9, wherein each work unit has associated with it work unit information comprising: a work unit identifier, an identifier for the last worker node to which it was assigned, a timestamp indicating the time at which the work unit was last assigned, and a link to one or more other pending work units assigned to the same worker node that have not been completed.

16. The computer system of claim 15, wherein the one or more processors are further configured to update the work unit information associated with a work unit when assigning that work unit.

17. The computer system of claim 9, wherein the one or more processors are further configured to distribute a third work unit to the first worker node, and re-distribute the third work unit to a third worker node in response to determining the re-distribution condition with respect to the first work unit.

18. A computer program product configured for use in a distributed computing environment that comprises a leader node, a leader aggregator at the leader node, a first worker node, a worker aggregator at the first worker node, a second worker node, and a worker aggregator at the second worker node, the computer program product comprising a non-transitory computer-readable medium having computer program logic stored therein for enabling a processor to perform a method comprising:
- receiving a work assignment at the leader node;
- dividing, by the leader node, the work assignment into a plurality of work units;
- receiving a message from the first worker node indicating that the first worker node is capable of accepting a work unit;
- distributing, by the leader node, a first work unit of he plurality of work units to the first worker node in response to the received message;
- receiving, by the worker aggregator at the first worker node, first results upon completely processing the first work unit;
- requesting, by the first worker node, a second work unit of the plurality of work units, without sending the first results to the leader aggregator;
- receiving, by the worker aggregator at the first worker node, second results representing a processed portion of the second work unit, as the first worker node processes the second work unit;
  - when the second work unit is completely processed, receiving, by the leader aggregator, the first and second results;
  - when the second work unit is not completely processed, receiving a second message, by the leader node, from the first worker node indicating that the first worker node has experienced a re-distribution condition with respect to the second work unit, wherein the re-distribution condition comprises a detected failure to completely process the second work unit, wherein the second message from the first worker node contains the second results from the second work unit available when the first worker node experienced the re-distribution condition;

re-distributing, by the leader node, an unprocessed portion of the second work unit to the second worker node for processing in response to receiving the second message;

receiving, by the worker aggregator at the second worker node, third results upon completely processing the unfinished portion of the second work unit; and receiving, by the leader aggregator, the first, second, and third results.

19. The method of claim 1, wherein the message from the worker node is unsolicited by the leader node.

20. The method of claim 1, the method further comprising:

receiving results for the first work unit from the second worker node; and combining the results received from the second worker node with the partial results from the first worker node.

21. The method of claim 1, further comprising receiving, prior to re-distributing, a message from the second worker node indicating that the second worker node is capable of accepting a work unit.

\* \* \* \* \*